Sept. 11, 1951  G. W. ASHLOCK, JR  2,567,591
MACHINE FOR PITTING CHERRIES
Filed Aug. 12, 1949  2 Sheets-Sheet 1

INVENTOR.
George W. Ashlock Jr.
BY
ATTORNEY

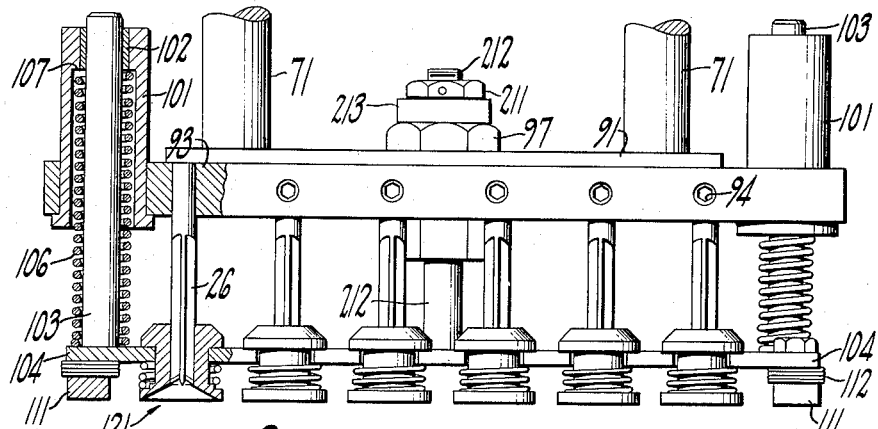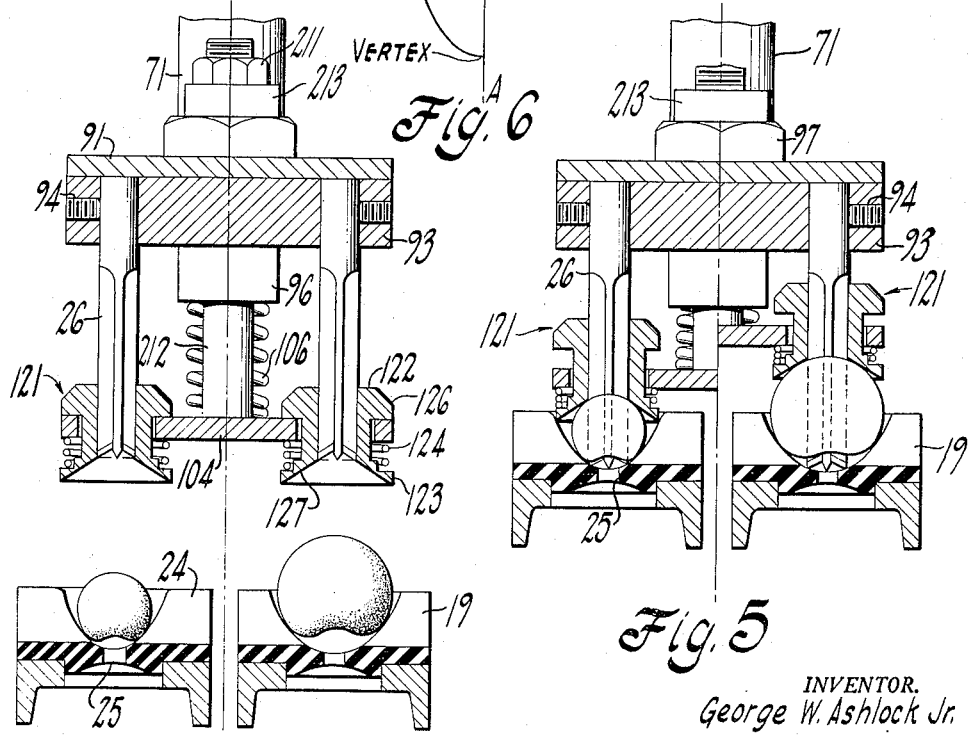

Patented Sept. 11, 1951

2,567,591

UNITED STATES PATENT OFFICE 2,567,591

MACHINE FOR PITTING CHERRIES

George W. Ashlock, Jr., Oakland, Calif.

Application August 12, 1949, Serial No. 110,008

4 Claims. (Cl. 146—19)

This invention relates to a fruit pitting machine and particularly to that mechanism for pitting cherries which is usually termed a cherry stoner. While the invention will be particularly described as it has been applied to a machine suited to the pitting of cherries, it will be obvious that, by suitable minor changes in the pitting knives and fruit carrying receptacles, the mechanism can be readily adapted to the pitting of other fruits, for example, peaches, apricots and olives.

In my prior Patents 2,157,518, issued May 9, 1939, and 2,219,832, issued October 29, 1940, there was disclosed a machine adapted for the pitting of fruit, and which included a continuously advanced conveyor in combination with a pitting mechanism which periodically followed the conveyor to pit fruit thereon. The fruit carrier structure extended horizontally for some distance in advance of the pitting mechanism to provide a work surface on which cherries could be spread and later straightened by hand or by suitable mechanism such as are disclosed in my patents.

Stoned cherries are ordinarily divided into two classes—pie cherries and those to be employed for the manufacture of fancy cherries such as maraschino cherries. The demand for the latter grade has increased in the last few years. Pie cherries are ordinarily fresh cherries pitted haphazardly, no attention being given as to whether or not the pit is ejected through the dimple or stem end of the cherry. A maraschino cherry, on the other hand, is a brined cherry. They are pitted with care, the pit being normally removed through the stem end of the cherry to cause as little rupture or break in the cherry as is possible. As is well known in the art, brined cherries, those stoned to provide maraschino cherries, are treated with a preservative solution. Brined cherries are much more brittle and harder than fresh cherries. Consequently, the manufacture of maraschino cherries presents certain unique problems.

With my prior machine when it was desired to produce the maraschino cherries, operators were stationed about the work table provided by the carrier to turn each cherry into position with its dimple or stem end down. This made the operation very expensive because about six operators were required to feed a machine at about its maximum operating rate, about 150 pitting operations per minute, or 900 cherries.

With the advent of automatic fruit orientation, particularly those disclosed in my Patents 2,212,892, 2,213,893, 2,250,518, 2,271,675, 2,296,490, 2,308,038, 2,308,039, 2,387,709 and 2,406,311, efforts were made to speed up the pitting mechanism and increase its operating rate. This led to the improvement of my Patent 2,219,832 and wherein the head or guideway for the pitting mechanism was moved forward in direction of advance of the carrier and, at the same time, the guideway was advanced downwardly toward the carrier, the pitting mechanism thereafter operating to pit fruit on the carrier. This permitted the pitting mechanism to be operated very rapidly and to be reciprocated at a rate of the order of 200-225 complete reciprocations per minute. This speed was satisfactory for pie cherries. However, upon cherries of the cocktail grade, it was necessary to operate the pitting mechanism at a speed of the order of 80 reciprocations per minute because the pitting knives, at any higher speed, caused the cherry to turn and bounce or roll in the receptacle. At speeds above about 80 reciprocations, cherries were either not pitted or were only partially pitted; in some instances, the pit would be forced through a portion of the supporting receptacle, thus ruining this as well as the fruit.

It is in general the broad object of the present invention to provide an improved machine for the rapid pitting of fruit, particularly for the stoning of cherries.

The invention includes other objects and features of advantage, some of which, together with the foregoing, will appear in the following description of the present preferred embodiment of the machine of my invention.

In the drawing accompanying and forming a part hereof, Figure 1 is an enlarged side elevation of the pitting mechanism and the carrier mechanism.

Figure 3 is a front elevation of a portion of the pitting mechanism embodying this invention.

Figures 4 and 5 are side elevations, partly in section, showing the pitting mechanism in different positions during the pitting operation.

Figure 6 is a diagram utilized in connection with disclosure of the present invention.

Figure 1:
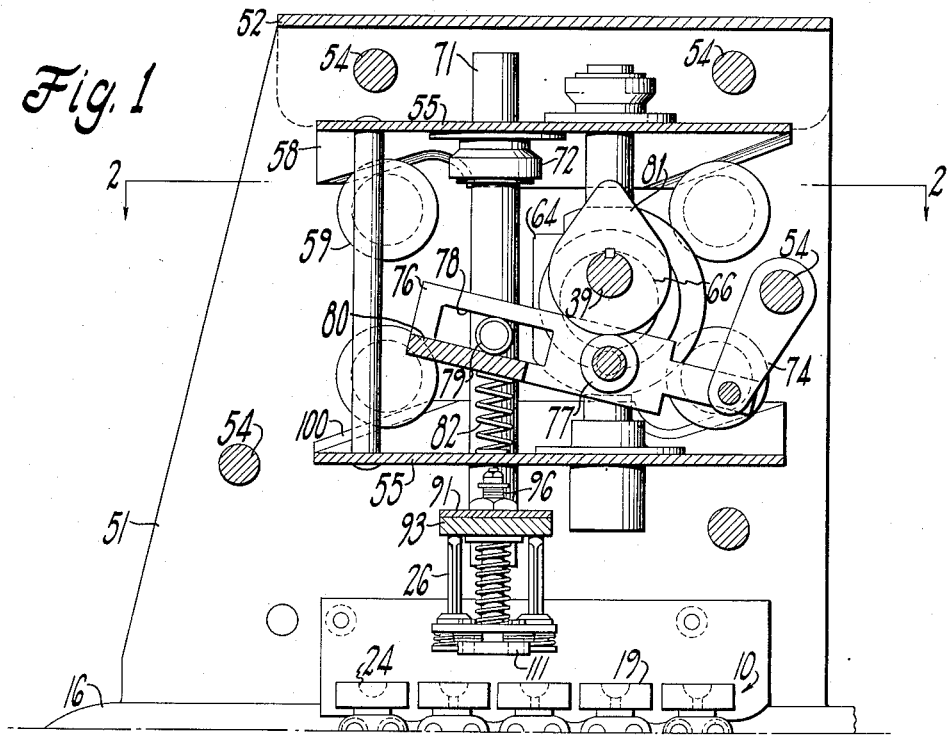
Figure 2:
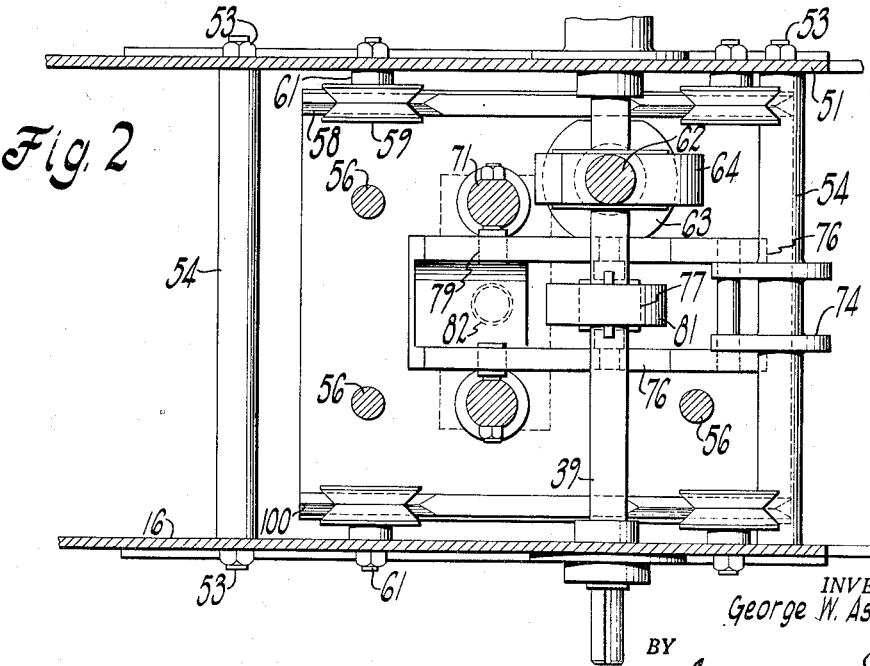
Figure 2 is a section taken along the lines of 2—2 in Figure 1.

The machine of the present invention includes a carrier structure generally indicated at 10 movable continuously past a presently described pitting mechanism. The machine also includes a suitable frame generally indicated at 16. The structure of the frame and of the carrier structure in relation thereto is fully disclosed in the aforementioned patents.

The fruit carrier structure 10 includes a plurality of individual fruit carriers 19, each fruit carrier having a plurality of fruit receptacles 24 therein in which the fruit is normally positioned with the dimple end of the fruit down, as a result of the operation of the orienting mechanisms of my aforementioned patents. When a suitable pitting mechanism, such as is typified by knives 26, is lowered to engage the fruit, it cuts the fruit forcing the pit out through the stem or dimple end of the cherry and through passage 25 in the rubber fruit carrier 19.

To effect the requisite movement of the pitting mechanism or knives, I preferably employ the relatively simple and light pitting operating mechanism disclosed in my aforementioned Patents 2,157,518 and 2,219,832. To this end the frame 16 includes opposite parallel vertically extending side members 51 supported on frame 16 and joined together by member 52 and nuts 53 at the end of rods 54 to provide a support for the pitting operating mechanism. Between the side plates is a head or guide structure which includes horizontal parallel plates 55 secured together in a spaced parallel relation as by spacers 56. Each plate carries a V-block 58 at opposite sides thereof engaged with V-rollers 59 mounted upon studs 61 on each side member. The V blocks and V rollers support the head structure provided by plates 55 for a reciprocating movement between the side members, toward and away from the carrier structure.

Means are provided for reciprocating the head structure provided by plates 55. This means includes a vertical shaft 62 slidably journalled in suitable bearings 63 in the plates 55. Mounted upon the shaft and carried thereby is an eccentric follower 64 within which is an eccentric 66 rotated by shaft 39. Shaft 39 is rotated by suitable drive mechanism as disclosed in detail in my aforementioned patent. Upon rotation of shaft 39, eccentric 66 is effective to reciprocate the head structure provided by plates 55 over its angular path as will be presently described in detail.

Referring to the V blocks 58, it is to be noted that each of these blocks includes an angularly formed V section 100 which is in engagement with the associated supporting V roller. In the structure disclosed in the aforementioned patent the configuration of the V blocks 58 were such that the head in its reciprocatory movement only moved in one plane, that is, horizontally. By positioning the V block surfaces so that the head reciprocates toward and away from the carrier, several unexpected but highly advantageous results are accomplished. In the first place, the movement of the pitting mechanism necessary to a pitting operation is reduced because the pitting mechanism is moved that much closer to the fruit to be pitted. At the same time the speed of the pitting operation can be materially increased because, by moving the pitting mechanism toward the fruit to be pitted without actual energization thereof, any lost motion in the pitting mechanism is taken up so that, upon actual operation of the pitting mechanism, the knives can move in to pit the fruit very quickly.

The angle of the faces 100 on the V blocks 58 is preferably made as steep as possible. I have operated with faces having an angularity of 20° to the horizontal with success, but this angle can be made more or less and I have operated with an angle as small as 2½°, though I prefer more.

The means provided on the head structure for operating a pitting mechanism includes two plungers 71 suitably journalled in bearings 72 on plates 55. Mounted upon one of the rods 54 are fixed arms 74 which extend to provide a support for spaced levers 76. Between the levers 76 is mounted a cam follower 77. The extending end of each lever 76 is slotted as at 78 to engage a roller 79 carried upon each plunger 71. Cam follower 77 is maintained in engagement with a cam 81 carried on shaft 39, spring 82 engages pad 80, which joins the levers 76, the spring urging levers 76 clockwise in Figure 1 so that the cam follower engages the cam at all times.

Extended between the plungers 71 is a plate 91 upon which is mounted a plurality of fruit cutting mechanisms, typically shown as the star-shaped knives 26. These knives are arranged in rows so that the cherries on a plurality of successive carriers are pitted at one time. Each knife 26 is secured in a plate 93 by a set screw 94. Plate 93 includes a bushing 96 projecting therefrom and through a hole in the plate 91; the end of the bushing is threaded and a nut 97 is employed to secure plate 93 on plate 91; the end of plungers 71 also project into receptacles 100 in the plate 93 to position and to retain this in location. Mounted at each end of plate 93 is a guide bushing 101 having a bearing 102 mounted at one end thereof. A rod 103 is secured to each end of plate 104, each rod projecting upwardly through a bearing 102, a spring 106 being positioned about the rod and between plate 104 and a shoulder 107 in the bushing 101. This provides a slidable, spring-biased support for the plate 104. Carrier-engaging plates 111 are provided at each end of the plate 104, suitable washers 112 being utilized as spacers so that when the pitting mechanism is lowered, the carrier-engaging plates come into engagement with the individual fruit carriers 19 beneath the pitting mechanism and holds these in position during removal of the pit. Travel of plate 104 away from plate 93 is limited by a nut 211 secured on a threaded rod 212 which extends slidably through bushing 96 from plate 104 to which the rod is secured. A rubber washer 213 is placed between nuts 97 and 211.

In accordance with this invention, I provide a fruit retaining means generally indicated by numeral 121 in cooperative association with each pitting knife 26; each fruit retaining means includes a tubular spool member 122 mounted in a slotted aperture in plate 104 and having a shoulder 123 thereon, a spring 124 being positioned between shoulder 123 and plate 104. The other end 126 of the spool member 122 engages the upper face of the supporting plate. Each member includes a suitable passage through which the associated knife 26 reciprocates. End 127 of the spool member 122 is arcuately formed to engage and retain fruit in a carrier receptacle; in the form shown, the end is cut away in the shape of a truncated cone so that fruit is suitably retained by the tubular member upon lowering of the pitting mechanism, as will be presently further described in detail.

Further, and in accordance with this invention, each receptacle 24 is preferably of a suitable arcuate contour. It has been usual heretofore to employ receptacles which were semi-circular in cross-section in the resilient facing as is disclosed in my Patents 2,209,305 and 2,314,862, and these can be employed, if desired. However, to secure the most efficient pitting of the fruit and the highest rate of operation, each receptacle 24, and particularly the fruit supporting portion thereof, is of a conoidal contour. Thus, referring particularly to Figures 4 and 5, it is to be noted that the cavity there shown in section is of an ellipsoidal shape. I have determined that in a receptacle of a size suitable for admission of any given grade of fruit, the fruit supporting portion of the receptacle or cavity should have a ratio of width to effective depth of between 0.6 and 1.8. The width of the cavity must, of course, be sufficient to admit the fruit readily even though its major axis is not aligned with the axis of symmetry of the cavity. The width is measured across the cavity at right angles to the axis of symmetry of the cavity and at an elevation above the bottom of the cavity corresponding to the effective depth of the cavity. By effective depth, I refer to the depth of that portion of the cavity which is active in orientation or pitting of the fruit. With fruit of a small diameter such as small cherries, the effective depth of the cavity is generally about equal to half the length of the major axis of the fruit and even as much as about 0.6 of the major axis to ensure that the force application during orientation does not cause the fruit to bounce or roll from the cavity. As the average diameter of the fruit is increased, the relative magnitude of the effective depth required for the cavity decreases with respect to the major axis of the fruit and with big cherries and fruit of an even larger size, the effective depth can be as small as about a fourth the major axis for the larger mass makes the fruit less liable to bounce out of the cavity. The ratio can be varied within the limits indicated, that is, between 0.6 and 1.8. For cherries, I have used a ratio of 1.3 and for olives of an elongated shape, a ratio of 0.8. Dates require a ratio of 0.8 and even less, while more nearly spherical fruit can be handled in a cavity embodying a ratio of 1.3 and up to 1.8.

The conoidal contour of the fruit supporting portion of the cavity stably supports the fruit and facilitates orientation of the fruit into a desired position for once the fruit is positioned with its dimple downward, it rests stably on the conoidal supporting side wall of the receptacle and tends to resist any subsequently applied force which might otherwise cause displacement and such as is applied when the fruit is pitted with a knife. With a conoidally shaped cavity, the fruit is firmly held during the pitting. With a spheroidally shaped supporting cavity and a spheroidally shaped fruit, stoning with a knife moved parallel to the vertical axis of the cavity frequently results in the pit or stone being forced through the base of the cavity instead of through the aperture 25 provided in the receptacle for stone passage. This, of course, ruins the cavity for further orientation and pitting. Thus misejection of the stone is prevented with a conoidally shaped cavity even though this depart from a spheroidal shape only to an otherwise apparently small extent.

With a conoidally shaped cavity, the fruit is stably engaged by the cavity, in which position it is retained. Also, the conoidal shape of the cavity tends to retain the fruit against turning after orientation and during any subsequent fruit processing such as a stone removing operation. Generally, it is only necessary to make so much of the bottom portion or fruit supporting portion of the cavity of a conoidal shape as is active in the orienting of the fruit and cooperates with the force applying means. When it is desired to use a relatively deep cavity, the upper portion of the cavity need not continue the conoidal shape of the bottom of the cavity since it merely provides a mechanical retaining means preventing the fruit from bouncing out of the cavity during initial feeding of the fruit by some mechanism as that disclosed in my Patents 2,190,970, 2,213,893 and 2,288,062.

Having determined the effective depth and the width to be employed in relation to the average size of the fruit to be oriented or pitted, one can draw two lines at right angles as in Figure 6, where line B—B corresponds to the width and A—C to the effective depth and A—C intersects B—B at its midpoint. The lowest point A is then connected to one of the points B by a conic section, e. g., a parabola, an ellipse or a hyperbola, the end portion of such conic section being employed and point A being taken as the vertex of the section. If it is desired to use a circular segment, then an arc is struck connecting points A and B; the radius used to strike the circular segment should be from 1.2 to 2.0 the effective depth.

The points A and B being connected, the connecting conic section is rotated about the line AC in Figure 6 to generate the conoidal cavity; the term conoidal cavity, as used herein and in the claims, is employed as referring to a cavity attained within the foregoing limitations.

In operation, with the pitting mechanism reciprocated at a desired rate, and with oriented fruit on the carrier, the pitting mechanism is moved toward pitting position. Initially, the engagement is between each of the tubular members 122 and a fruit positioned in one of the fruit carrying receptacles. Inasmuch as the pitting mechanism is moving forward at the same rate as the carrier, the tubular member 122 merely retains the fruit in position, being assisted in this respect by the conoidally shaped contour of the cavity whereby the fruit is retained against rotation and against slipping during the pitting by the knife. Subsequently, the carrier engaging plates 111 engage the carrier and limit further movement of the spool members to engage the fruit. In this manner, the retaining force on the fruit is limited to that of the spring 124 so the fruit is not crushed and is not even bruised. Thereafter, and in a timed relationship, the knife is lowered to engage the stone in the fruit and force it from the fruit through the aperture 25 in the bottom of the fruit-carrying receptacle 24. The knife is then raised; when it is free of the fruit, the spool members release the fruit, stripping fruit flesh from the knife as it returns. During this entire operation the carrier and the entire pitting mechanism has been advancing; when the pitting operation is complete, the mechanism is returned for another operation.

From the foregoing, I believe it will be apparent that I have provided a relatively novel and simple form of fruit-pitting mechanism for the rapid and uniform pitting of fruit, particularly cherries. The mechanism is suited to the simultaneous handling of fruit of different sizes as will be apparent upon an examination of the mechanism in Figures 4 and 5 wherein I have shown it in the course of stoning simultaneously fruit of different sizes in adjacent cavities.

I claim:

1. In a pitting machine, a fruit carrier movable continuously past a pitting station, a pitting knife, means supporting said knife over said carrier, carrier engaging means including a stripper plate slidable on the knife, means supporting said carrier engaging means from the knife support means for movement toward and away from said knife support means, a fruit engaging means slidable on said knife and slidably supported in the stripper plate, and means for moving the knife supporting means first to engage the carrier engaging means with the carrier and then move the stripper plate to bring the fruit engaging means thereon into contact with fruit on the carrier and then slide said fruit engaging means with respect to the stripper plate and the knife and, finally, to pass the knife through the fruit engaging means to pit the fruit.

2. In a pitting machine, a fruit carrier movable continuously past a pitting station, a pitting knife, means supporting said knife over said carrier, carrier engaging means, means supporting said carrier engaging means from the knife support means for movement toward and away from said knife support means, a spool slidable on said knife and slidably supported in the means supporting the carrier engaging means and having one end thereof formed to engage and retain a fruit on said carrier, a spring biasing the spool toward a fruit on said carrier, and means for moving the carrier engaging means into carrier engagement and to bring the spool end into engagement with a fruit on a carrier and slide the spool on the knife, and then to advance the knife through the spool to pit the fruit and then retract the knife through the spool to strip fruit off the knife.

3. In a machine of the character described, a continuous fruit carrier movable over a path and having a series of fruit receptacles movable past a pitting station, means for pitting fruit at said station including a first and a second plate, means supporting the first plate in a spaced parallel relation to that portion of the carrier present at the pitting station, means supporting the second plate from the first plate in a parallel relation thereto with the second plate superimposed over said carrier portion and for reciprocating movement with respect to the first plate, a knife projecting from the first plate and through an aperture in the second plate, means on the second plate for engaging the carrier portion, a spool mounted slidably in said aperture in the second plate and having a passage therein in which said knife is reciprocated, said spool having an end projecting toward the carrier and formed to engage a fruit on the carrier, a spring biasing said spool toward the knife end to strip fruit impaled on the knife; and means for moving the first plate toward the carrier, first to engage the second plate with the carrier and move the second plate toward the first plate, second, thereafter engage said spool with a fruit on the carrier at said station, third, move said knife through said spool to pit the fruit engaged with the spool and, thereafter, fourth, to retract the knife through the spool to strip fruit therefrom, fifth, to release the engagement of the spool and the fruit and, sixth, release the engagement of the second plate and the carrier.

4. In a fruit pitting machine including a fruit carrier, a pitting knife, a stripper plate through which the knife is movable to pit fruit on the carrier, the improvement consisting in a tubular spool mounted slidably in the stripper plate about a portion of the knife and having an end thereon adapted to engage and retain a fruit on the carrier during pitting by the knife, and a spring between the spool and the stripper plate biasing the spool toward the fruit to be engaged on the carrier.

GEORGE W. ASHLOCK, Jr.

REFERENCES CITED

The following references are of record in the file of this patent:

UNITED STATES PATENTS

| Number | Name | Date |
| --- | --- | --- |
| 169,525 | Darrach | Nov. 2, 1875 |
| 1,155,449 | Smith | Oct. 5, 1915 |
| 2,180,647 | Steinbiss | Nov. 21, 1939 |
| 2,219,832 | Ashlock, Jr. | Oct. 29, 1940 |
| 2,243,530 | Kok | May 27, 1941 |
| 2,271,675 | Ashlock, Jr. | Feb. 3, 1942 |
| 2,314,862 | Ashlock, Jr. | Mar. 30, 1943 |